United States Patent
Takeda et al.

(10) Patent No.: US 9,439,181 B2
(45) Date of Patent: *Sep. 6, 2016

(54) RADIO COMMUNICATION SYSTEM, RADIO BASE STATION APPARATUS, USER TERMINAL, AND RADIO COMMUNICATION METHOD

(71) Applicant: NTT DOCOMO, INC., Tokyo (JP)

(72) Inventors: Kazuaki Takeda, Tokyo (JP); Liu Liu, Beijing (CN); Lan Chen, Beijing (CN); Qin Mu, Beijing (CN); Wenbo Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 14/355,645

(22) PCT Filed: Nov. 8, 2012

(86) PCT No.: PCT/JP2012/078994
§ 371 (c)(1),
(2) Date: May 1, 2014

(87) PCT Pub. No.: WO2013/069733
PCT Pub. Date: May 16, 2013

(65) Prior Publication Data
US 2014/0241223 A1 Aug. 28, 2014

(30) Foreign Application Priority Data
Nov. 9, 2011 (JP) ................................. 2011-245866

(51) Int. Cl.
*G01R 31/08* (2006.01)
*H04W 72/04* (2009.01)
(Continued)

(52) U.S. Cl.
CPC .............. *H04W 72/042* (2013.01); *H04J 3/00* (2013.01); *H04L 5/001* (2013.01); *H04L 5/0053* (2013.01); *H04L 5/1469* (2013.01); *H04W 72/1289* (2013.01); *H04L 5/0094* (2013.01)

(58) Field of Classification Search
CPC  H04W 72/042; H04W 72/1289; H04L 1/18; H04L 5/001; H04L 5/0053; H04L 5/1469; H04L 5/0094; H04J 3/00
See application file for complete search history.

(56) References Cited

U.S. PATENT DOCUMENTS

2007/0079207 A1* 4/2007 Seidel ................... H04L 1/1845
714/748
2012/0093107 A1* 4/2012 Jeong ................ H04W 72/1215
370/329

(Continued)

OTHER PUBLICATIONS

International Search Report for corresponding International Application No. PCT/JP2012/078994, mailed Dec. 18, 2012 (2 pages).

(Continued)

*Primary Examiner* — Robert Wilson
(74) *Attorney, Agent, or Firm* — Osha Liang LLP

(57) ABSTRACT

According to the present invention, even when the ratio between uplink subframes and downlink subframes is changed in each component carrier in TDD carrier aggregation, it is still possible to prevent a decrease in capacity. With the radio communication method according to the present invention, a radio base station apparatus generates a downlink control channel signal containing downlink control information including carrier indicator field information, and transmits the downlink control channel signal to a user terminal, and the user terminal receives the downlink control channel signal, and executes signal processing with respect to the downlink signal in accordance with the downlink control information. In this case, the carrier indicator field information is information which associates a carrier index and the index of a secondary cell subframe to be scheduled.

13 Claims, 12 Drawing Sheets

(51) Int. Cl.
*H04W 72/12* (2009.01)
*H04L 5/00* (2006.01)
*H04L 5/14* (2006.01)
*H04J 3/00* (2006.01)

(56) References Cited

U.S. PATENT DOCUMENTS

| | | | | |
|---|---|---|---|---|
| 2013/0028108 A1* | 1/2013 | Wu | ............... | H04L 5/001 370/252 |
| 2013/0058240 A1* | 3/2013 | Kim | ............... | H04L 5/0007 370/252 |
| 2013/0163553 A1* | 6/2013 | Lee | ............... | H04L 1/0027 370/329 |
| 2013/0182627 A1* | 7/2013 | Lee | ............... | H04W 72/042 370/311 |
| 2014/0126485 A1* | 5/2014 | Chen | ............... | H04L 5/0053 370/329 |
| 2014/0126490 A1* | 5/2014 | Chen | ............... | H04L 5/0048 370/329 |
| 2014/0241223 A1* | 8/2014 | Takeda | ............... | H04W 72/1289 370/280 |
| 2014/0348038 A1* | 11/2014 | Takeda | ............... | H04L 5/14 370/280 |
| 2015/0146586 A1* | 5/2015 | Takeda | ............... | H04L 1/18 370/280 |

OTHER PUBLICATIONS

NTT DOCOMO; "PDCCH Enhancement for Different TDD UL-DL Configuration on Different Bands;" 3GPP TSG RAN WG1 Meeting #68, R1-120670; Dresden, Germany; Feb. 6-10, 2012 (5 pages).

3GPP TR 25.912 V7.1.0; "3rd Generation Partnership Project; Technical Specification Group Access Network; Feasibility study for evolved Universal Terrestrial Radio Access (UTRA) and Universal Terrestrial Radio Access Network (UTRAN) (Release 7);" Sep. 2006 (57 pages).

* cited by examiner

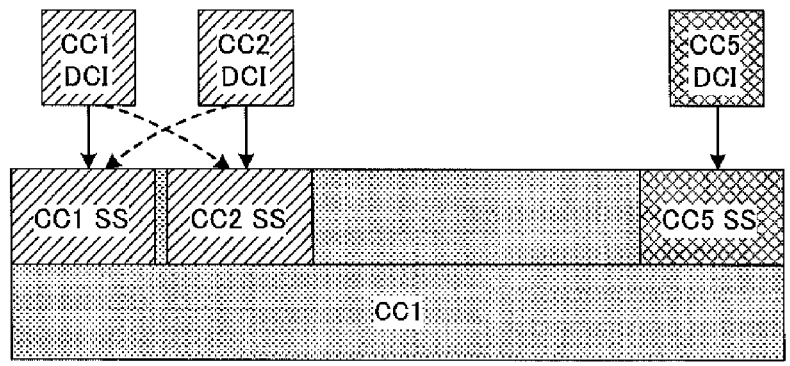
FIG. 6A
| CELL INDEX | SUBFRAME INDEX | CIF |
|---|---|---|
| 1 | 1 | 000 |
| | 2 | 001 |
| | 3 | 010 |
| | 4 | 011 |
| 2 | 1 | 100 |
| | 2 | 101 |
| | 3 | 110 |
| | 4 | 111 |
FIG. 6B
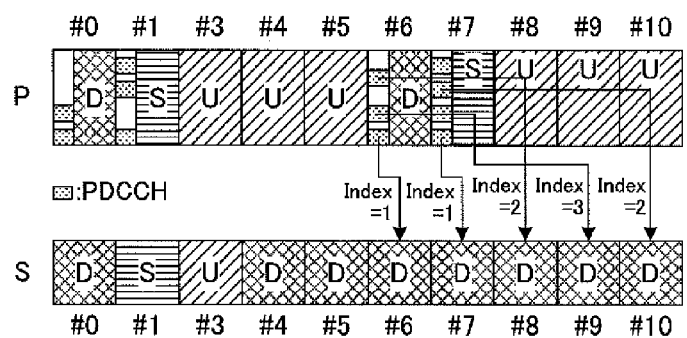
FIG. 6C

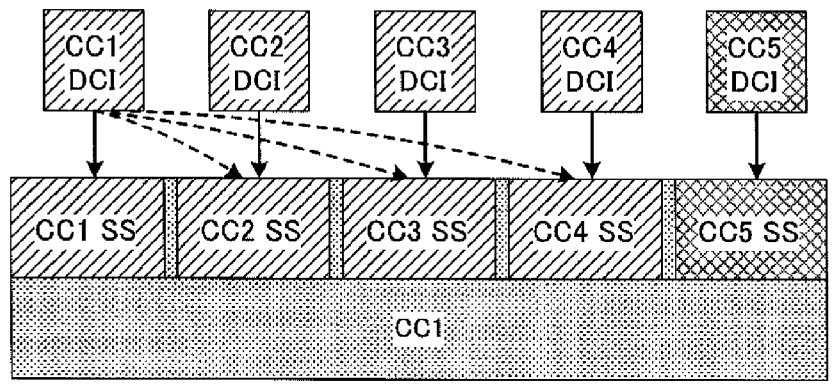
FIG. 7A
| CELL INDEX | SUBFRAME INDEX | CIF |
|---|---|---|
| 1 | 1 | 000 |
| | 2 | 001 |
| 2 | 1 | 010 |
| | 2 | 011 |
| 3 | 1 | 100 |
| | 2 | 101 |
| 4 | 1 | 110 |
| | 2 | 111 |
FIG. 7B
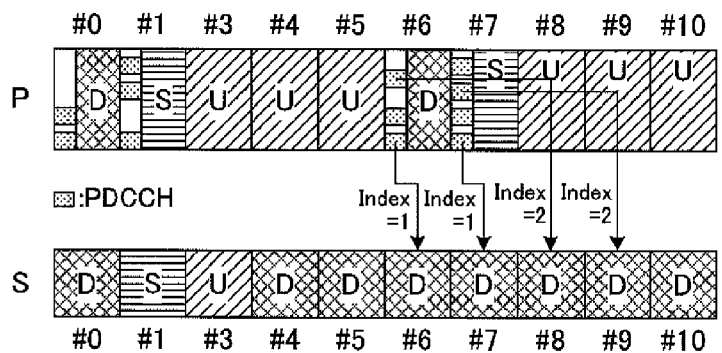
FIG. 7C

RADIO COMMUNICATION SYSTEM, RADIO BASE STATION APPARATUS, USER TERMINAL, AND RADIO COMMUNICATION METHOD

TECHNICAL FIELD

The present invention relates to a radio communication system, a radio base station apparatus, a user terminal and a radio communication method that are applicable to a cellular system and so on.

BACKGROUND ART

In a UMTS (Universal Mobile Telecommunications System) network, attempts are made to optimize features of the system, which are based on W-CDMA (Wideband Code Division Multiple Access), by adopting HSDPA (High Speed Downlink Packet Access) and HSUPA (High Speed Uplink Packet Access), for the purposes of improving spectral efficiency and improving the data rates. With this UMTS network, long-term evolution (LTE) is under study for the purposes of further increasing high-speed data rates, providing low delay, and so on (non-patent literature 1).

In the third-generation system, a transmission rate of maximum approximately 2 Mbps can be achieved on the downlink by using a fixed band of approximately 5 MHz. Meanwhile, in the LTE system, it is possible to achieve a transmission rate of about maximum 300 Mbps on the downlink and about 75 Mbps on the uplink by using a variable band which ranges from 1.4 MHz to 20 MHz. Furthermore, with the UMTS network, successor systems of LTE are also under study for the purpose of achieving further broadbandization and higher speed (for example, LTE-Advanced ("LTE-A")). The system band of the LTE-A system includes at least one component carrier (cell), where the system band of the LTE system is one unit. Widening the band by gathering a plurality of component carriers like this is referred to as "carrier aggregation."

In radio communication, as uplink and downlink duplexing methods, there are frequency division duplexing (FDD) to divide the uplink and the downlink by frequency and time division duplexing (TDD) to divide the uplink and the downlink by time. In release-10 LTE, when carrier aggregation is executed in TDD, as shown in FIG. 1A, the ratio between uplink subframes and downlink subframes (transmission time intervals: TTIs) is the same in all component carriers. In release-11 LTE, considering application of a heterogeneous network and so on, as shown in FIG. 1B, changing the ratio between uplink subframes and downlink subframes in each component carrier when carrier aggregation is executed in TDD, is under study.

Meanwhile, when broadbandization is achieved by increasing the number of component carriers (the number of carrier aggregations) to use for communication between a radio base station apparatus and a user terminal, as shown in FIG. 2, for example, it is possible to multiplex and transmit downlink control information (DCI 2) for a downlink shared channel to be transmitted in a component carrier CC 2 (S-cell (Secondary-cell)) over a downlink control channel (PDCCH) of another component carrier CC 1 (P-cell (Primary-cell)) (cross-carrier scheduling). Here, in order to identify in relationship to which component carrier (CC 1 or CC 2) the downlink control information (DCI 2) provides downlink shared channel information, a DCI configuration in which a carrier indicator (CI) is attached is adopted. The field to represent the carrier indicator (CI) is the CIF. That is to say, when DCI for a shared data channel demodulation to be multiplexed on the data field of a given component carrier is multiplexed over the control channel field of another component carrier, a CIF to represent the index of the component carrier (carrier index) where the shared data channel to be demodulated is multiplexed, is added to the DCI.

CITATION LIST

Non-Patent Literature

Non-Patent Literature 1: 3GPP, TR25.912 (V7.1.0), "Feasibility Study for Evolved UTRA and UTRAN," September 2006

SUMMARY OF INVENTION

Technical Problem

As shown in FIG. 1B, when, in TDD carrier aggregation, the ratio between uplink subframes and downlink subframes is changed in each component carrier, cases might occur where, as shown in FIG. 3, the number of downlink subframes in the P-cell becomes smaller than the number of downlink subframes in the S-cell. If cross-carrier scheduling is applied in this case, given that there are relatively few P-cell downlink subframes, subframes that are not scheduled by the PDCCH (Physical Downlink Control Channel) of the P-cell are produced in the S-cell.

For example, referring to FIG. 3, the fourth and fifth downlink subframes for the S-cell from the left and the eighth uplink subframe for the S-cell from the left are subframes that are not scheduled. The fourth and fifth downlink S-cell subframes from the left are not scheduled because the subframes of the P-cell corresponding to these subframes are the uplink and therefore cross-carrier scheduling is not possible. Also, scheduling information for an uplink subframe of the S-cell is reported in the subframe of the P-cell that is four subframes earlier. However, the P-cell subframe that is four subframes earlier and corresponds to the eighth uplink subframe of the S-cell from the left is the uplink, and therefore scheduling is not possible.

Here, the definitions of the subframes shown in FIG. 3 will be given below. A common subframe ("C-subframe") refers to a downlink or uplink subframe that can be scheduled by the PDCCH in the present subframe or in a link subframe. A victim subframe ("V-subframe") refers to a downlink or uplink subframe that cannot be scheduled by the PDCCH in the present subframe or in a link subframe. A super subframe ("S-subframe") refers to a subframe that can schedule victim subframes.

In this way, if S-cell subframes cannot be scheduled, problems of capacity decrease may arise, including: (1) the peak data rate decreases; (2) the freedom of scheduling decreases; (3) the scheduling delay increases; and (4) multi-user diversity cannot be optimized efficiently, and so on.

The present invention has been made in view of the above, and it is therefore an object of the present invention to provide a radio communication system, a radio base station apparatus, a user terminal and a radio communication method, whereby, even when the ratio between uplink subframes and downlink subframes is changed in each component carrier in TDD carrier aggregation, it is still possible to prevent a decrease in capacity.

Solution to Problem

A radio communication system according to the present invention includes a radio base station apparatus and a user terminal that performs radio communication with the radio base station apparatus by time division duplexing, and achieves broadbandization by carrier aggregation, and, in this radio communication system, the radio base station apparatus has a generating section configured to generate a downlink control channel signal containing downlink control information including carrier indicator field information, and a transmission section configured to transmit the downlink control channel signal to the user terminal, and the user terminal has a receiving section configured to receive the downlink control channel signal, and a signal processing section configured to execute signal processing with respect to a downlink signal in accordance with the downlink control information, and, in this radio communication system, the carrier indicator field information is information that associates a carrier index and an index of a subframe of a secondary cell to be scheduled.

A radio base station apparatus according to the present invention is a radio base station apparatus in a radio communication system which includes the radio base station apparatus and a user terminal that performs radio communication with the radio base station apparatus by time division duplexing, and which achieves broadbandization by carrier aggregation, and this radio base station apparatus has a generating section configured to generate a downlink control channel signal containing downlink control information including carrier indicator field information, and a transmission section configured to transmit the downlink control channel signal to the user terminal, and, in this radio base station apparatus, the carrier indicator field information is information that associates a carrier index and an index of a subframe of a secondary cell to be scheduled.

A user terminal according to the present invention is a user terminal in a radio communication system which includes a radio base station apparatus and the user terminal that performs radio communication with the radio base station apparatus by time division duplexing, and which achieves broadbandization by carrier aggregation, and this user terminal has a receiving section configured to receive a downlink control channel signal containing downlink control information including carrier indicator field information, and a signal processing section configured to execute signal processing with respect to a downlink signal in accordance with the downlink control information, and, in this user terminal, the carrier indicator field information is information that associates a carrier index and an index of a subframe of a secondary cell to be scheduled.

A radio communication method according to the present invention is a radio communication method in a radio communication system which includes a radio base station apparatus and a user terminal that performs radio communication with the radio base station apparatus by time division duplexing, and which achieves broadbandization by carrier aggregation, and this radio communication method includes the steps of, at the radio base station apparatus, generating a downlink control channel signal containing downlink control information including carrier indicator field information, and transmitting the downlink control channel signal to the user terminal; and, and, at the user terminal, receiving the downlink control channel signal, and executing signal processing with respect to a downlink signal in accordance with the downlink control information, and, in this radio communication method, the carrier indicator field information is information that associates a carrier index and an index of a sub frame of a secondary cell to be scheduled.

Advantageous Effects of Invention

With the present invention, even when the ratio between uplink subframes and downlink subframes is changed in each component carrier in TDD carrier aggregation, it is still possible to prevent a decrease in capacity.

BRIEF DESCRIPTION OF DRAWINGS

FIG. 6 provides a diagram to show the relationship between downlink control information and search spaces, a diagram to show a table in which carrier indices and subframe indices to schedule victim subframes are associated with each other, and a diagram to explain scheduling of an S-cell by a P-cell;

FIG. 7 provides a diagram to show the relationship between downlink control information and search spaces, a diagram to show a table in which carrier indices and subframe indices to schedule victim subframes are associated with each other, and a diagram to explain scheduling of an S-cell by a P-cell;

DESCRIPTION OF EMBODIMENTS

Now, an embodiment of the present invention will be described below in detail with reference to the accompanying drawings.

Figure 1B:
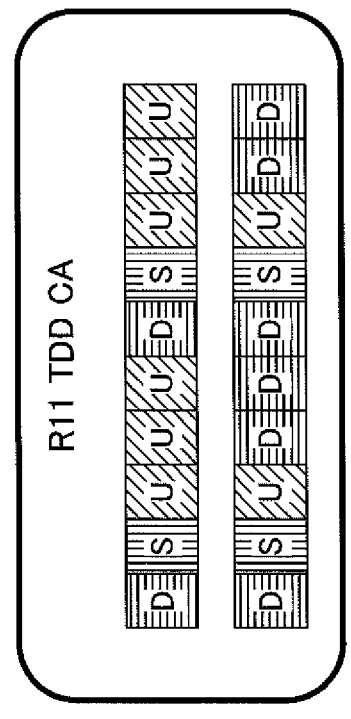
FIG. 1 provides diagrams to explain carrier aggregation in TDD.
Figure 1A:
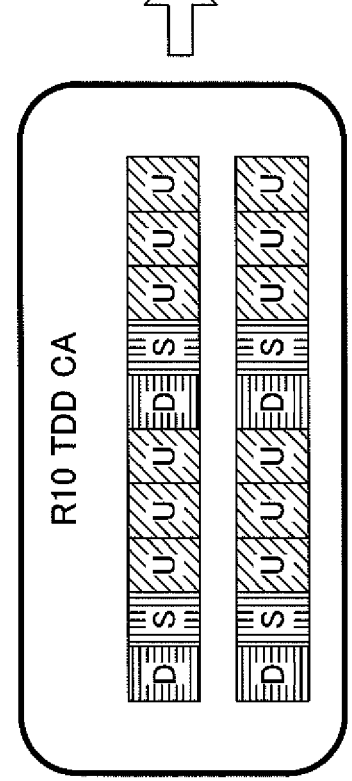
Figure 2:
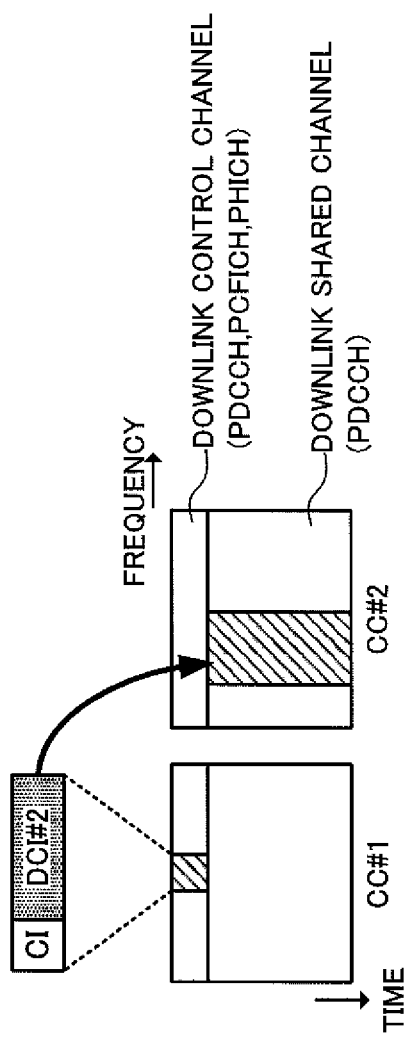
FIG. 2 is a diagram to explain cross-carrier scheduling.
Figure 3:
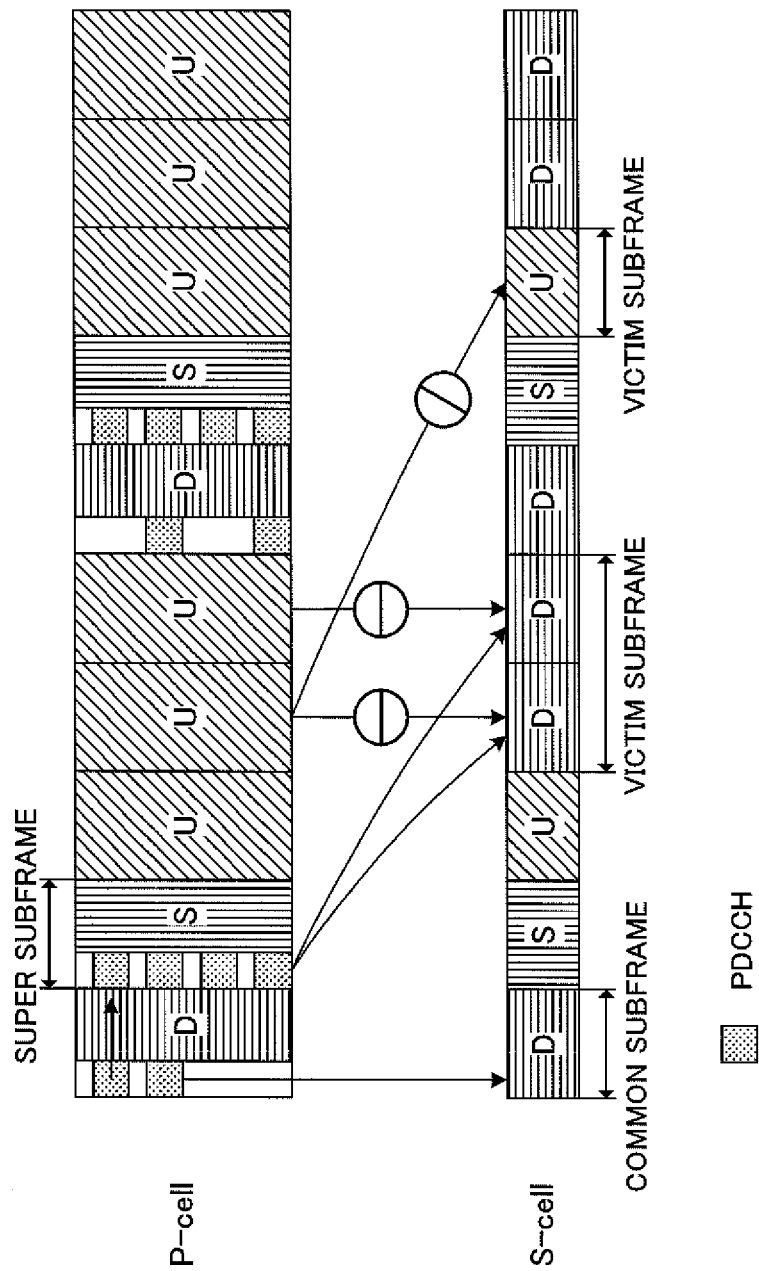
FIG. 3 is a diagram to show a case where the ratio between uplink subframes and downlink subframes is changed in each component carrier in TDD carrier aggregation.

As described above, when the ratio between uplink subframes and downlink subframes is changed in each component carrier in TDD carrier aggregation, case might occur where, as shown in FIG. 3, S-cell subframes cannot be scheduled in the P-cell, if the number of downlink subframes in the P-cell is smaller than the number of downlink subframes in the S-cell.

Figure 4:
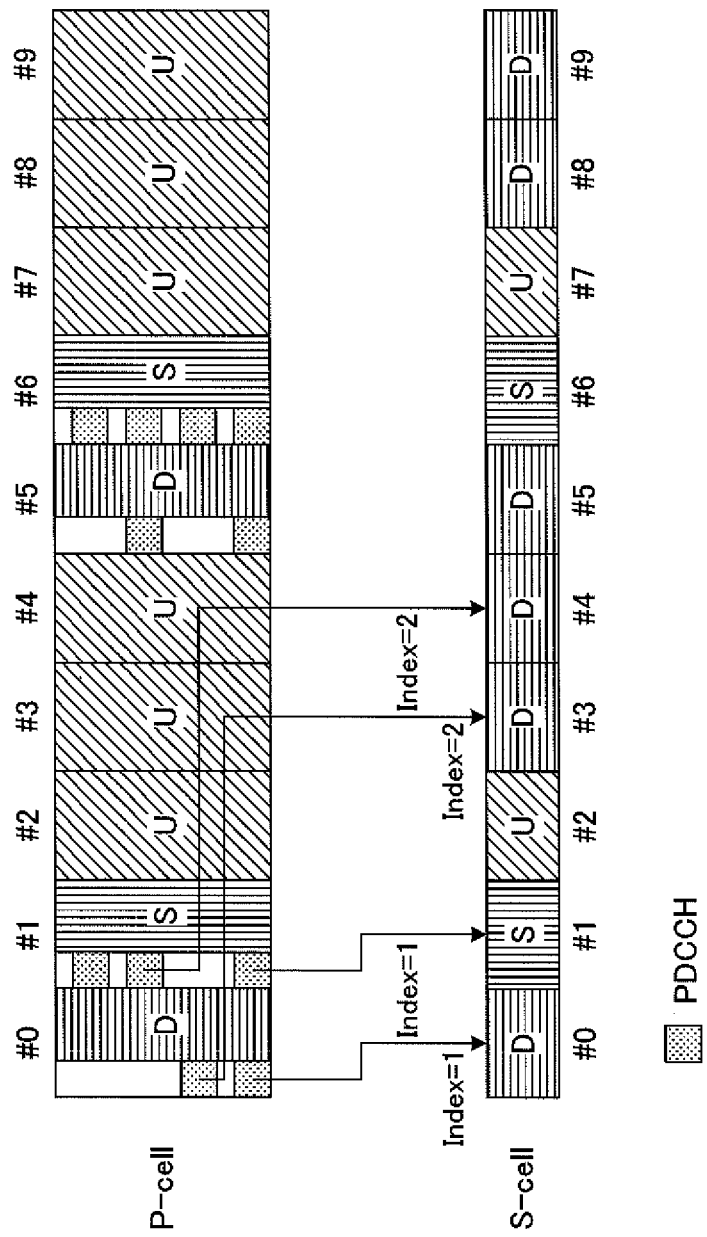
FIG. 4 is a diagram to explain a case where one HARQ process is applied to scheduling information for three victim subframes.

In this case, scheduling victim subframes in the S-cell in a super subframe (S-subframe) of the P-cell, as shown in FIG. 4, is under study. With this method, one victim subframe is scheduled using one PDCCH signal in an S-subframe. In FIG. 4, victim subframes (subframe #1 and subframe #4) of the S-cell are scheduled using PDCCH signals of an S-subframe (subframe #1) of the P-cell. In this case, a victim subframe (subframe #1) of the S-cell is scheduled using one PDCCH signal of subframe #1 of the P-cell, and a victim subframe (subframe #4) of the S-cell is scheduled using another PDCCH signal of subframe #1 of the P-cell.

Similarly, downlink subframes (subframe #0 and subframe #3) of the S-cell are scheduled using PDCCH signals of a downlink subframe (subframe #0) of the P-cell. In this case, a downlink subframe (subframe #0) of the S-cell is scheduled using one PDCCH signal of downlink subframe #0 of the P-cell, and a downlink subframe (subframe #3) of the S-cell is scheduled using another PDCCH signal of downlink subframe #0 of the P-cell.

In this case, for example, when victim subframes (subframe #1 and subframe #4) of the S-cell are scheduled using PDCCH signals of an S-subframe (subframe #1) of the P-cell, it is necessary to report the victim subframe numbers (subframe #1 and subframe #4) which the S-subframe (subframe #1) of the P-cell can schedule, to a user terminal. Similarly, when downlink subframes (subframe #0 and subframe #3) of the S-cell are scheduled using PDCCH signals of a downlink subframe (subframe #0) of the P-cell, it is necessary to report the downlink subframe numbers (subframe #0 and subframe #3) which the downlink subframe (subframe #0) of the P-cell can schedule, to a user terminal.

Figure 5A:
FIG. 5 provides diagrams to explain the content of downlink control information.
Figure 5B:

In this way, when subframe numbers which a P-cell subframe can schedule is reported, for example, as shown in FIG. 5B, it may be possible to attach subframe indices (SIs) (index=1 and index=2 in FIG. 4) to downlink control information (DCI), and report the subframe numbers to a user terminal by those subframe indices. However, when SIs are attached to DCI in this way, the size of the DCI becomes different from that defined in Release-10 LTE, shown in FIG. 5A, and therefore backward compatibility cannot be achieved.

Consequently, the present inventors have focused on the CIF (carrier index field) of downlink control information, and, upon finding out that information about the indices of S-cell subframes scheduled by a P-cell subframe can be dynamically reported to a user terminal, by defining information of this CIF in information that associates carrier indices (CIs) and the indices of subframes that are scheduled by an S-subframe with each other, arrived at the present invention.

According to the present invention, it is possible to dynamically report information about the indices of S-cell subframes which can be scheduled by a P-cell subframe to a user terminal, so that, even when the ratio between uplink subframes and downlink subframes is changed in each component carrier in TDD carrier aggregation, it is still possible to prevent a decrease in capacity, and, furthermore, prevent the transmission rate from decreasing and the retransmission time from becoming longer, and, consequently, improve the freedom of scheduling.

In the present invention, carrier indicator field (CIF) information is information which associates carrier indices (CIs) and the indices of S-cell subframes to be scheduled. This association will be described using FIG. 6 and FIG. 7. FIG. 6A and FIG. 7A are diagrams, each showing the relationship between downlink control information and search spaces, and FIG. 6B and FIG. 7B are diagrams, each showing a table in which carrier indices and the indices of S-cell subframes to be scheduled are associated with each other, and FIG. 6C and FIG. 7C are diagrams to explain scheduling of the S-cell by the P-cell.

In FIG. 6A, the PDCCH of one component carrier (CC) (P-cell) is shown. In the case shown in FIG. 6A, search spaces for a plurality of component carriers (of the P-cell and the S-cell) are provided separately. In each search space, downlink control information (DCI) is multiplexed. In FIG. 6A, from the left, a search space where DCI for CC 1 is multiplexed, a search space where DCI for CC 2 is multiplexed, and a search space where DCI for CC 5 is multiplexed are arranged. Note that shown here is a case where CC 1 and CC 2 have the same bandwidth, the same transmission mode, and therefore have the same DCI size, and where other CCs have varying DCI sizes. Also, in the case shown in FIG. 6A, cross-carrier scheduling is limited (limited to three CCs).

In the case shown in FIG. 6A, CC 1 and CC 2 have the same DCI size, so that the CIF for carrier identification requires one bit for CC 1 and CC 2. Consequently, two bits of the CIF, which is formed with three bits, become redundancy bits. With the present invention, these redundancy bits are assigned to the indices of S-cell subframes to be scheduled. The table shown in FIG. 6B is a table in which the subframe indices in the search space configuration shown in FIG. 6A are assigned bits. As seen in FIG. 6B, the indices of subframes to be scheduled are associated with the CIF bits. That is to say, since two CIF bits are associated with the indices of subframes to be scheduled by means of the table of FIG. 6B, it is possible to report four patterns of subframe indices with respect to each of CC 1 and CC 2.

Consequently, as shown in FIG. 6C, it is possible to report four or fewer subframe indices when scheduling S-cell subframes (downlink subframes, victim subframes) by a P-cell subframe (downlink subframe, S-subframe). In FIG. 6C, in a downlink subframe (subframe #5) of the P-cell (CI #1), three subframe indices are reported in three PDCCH signals. To be more specific, as shown in FIG. 6C, when the CIF "000" is reported in one PDCCH, this means reporting index=1, when the CIF "001" is reported in one PDCCH, this means reporting index=2, and when the CIF "010" is reported in one PDCCH, this means reporting index=3. Similarly, in FIG. 6C, two subframe indices are reported in two PDCCH signals, in an S-subframe (subframe #6) of the P-cell (CI #1). To be more specific, as shown in FIG. 6C, when the CIF "000" is reported in one PDCCH, this means reporting index=1, and, when the CIF "001" is reported in one PDCCH, this means reporting index=2.

A subframe index (index=n) indicates an S-cell subframe which a P-cell subframe can schedule. For example, when victim subframes of the S-cell which an S-subframe of the P-cell can schedule are subframes #0, #3 and #4, these subframes #0, #3 and #4 correspond to subframe indices #1, #2 and #3, respectively. That is to say, when index=1 is reported, this means that subframe #0 is scheduled, when index=2 is reported, this means that subframe #3 is scheduled, and, when index=3 is reported, this means that subframe #4 is scheduled. Consequently, by reporting subframe indices to a user terminal in DCI, the user terminal is able to know which subframes of the S-cell are scheduled. Note that information about S-cell subframes which a P-cell subframe can schedule (mapping information of P-cell subframes and S-cell subframes) is reported from a radio base station apparatus to a user terminal through higher layer signaling (RRC signaling).

In the case shown in FIG. 7A, the search spaces of CC 1, CC 2, CC 3, and CC 4 are shared, so that the CIF for carrier identification requires two bits for CC 1, CC 2, CC 3, and CC 4. Consequently, one bit of the CIF, which is formed with three bits, becomes a redundancy bit. With the present invention, this redundancy bit is assigned to the indices of S-cell subframes to be scheduled. The table shown in FIG. 7B is a table in which the subframe indices in the search space configuration shown in FIG. 7A are assigned bits. As seen in FIG. 7B, the indices of subframes to be scheduled are associated with the CIF bits. That is to say, since one CIF bit is associated with the indices of subframes to be scheduled by means of the table of FIG. 7B, it is possible to report two patterns of subframe indices with respect to each of CC 1, CC 2, CC 3 and CC 4.

Consequently, as shown in FIG. 7C, it is possible to report two or fewer subframe indices when scheduling S-cell subframes (downlink subframes, victim subframes) by a P-cell subframe (downlink subframe, S-subframe). In FIG. 7C, two subframe indices are reported in each of two PDCCH signals, in a downlink subframe (subframe #5) of the P-cell (CI #1). To be more specific, as shown in FIG. 7C, when the CIF "000" is reported in one PDCCH, this means reporting index=1, and when the CIF "001" is reported in one PDCCH, this means reporting index=2. Similarly, in FIG. 7C, two subframe indices are reported in each of two PDCCH signals, in an S-subframe (subframe #6) of the P-cell (CI #1). To be more specific, as shown in FIG. 7C, when the CIF "000" is reported in one PDCCH, this means reporting index=1, and, when the CIF "001" is reported in one PDCCH, this means reporting index=2.

A subframe index (index=n) indicates an S-cell subframe which a P-cell subframe can schedule. For example, when victim subframes of the S-cell which an S-subframe of the P-cell can schedule are subframes #0 and #3, these subframes #0 and #3 correspond to subframe indices #1 and #2, respectively. That is to say, when index=1 is reported, this means that subframe #0 is scheduled, when index=2 is reported, this means that subframe #3 is scheduled. Consequently, by reporting subframe indices to a user terminal in DCI, the user terminal is able to know which subframes of the S-cell are scheduled. Note that information about S-cell subframes which a P-cell subframe can schedule (mapping information of P-cell subframes and S-cell subframes) is reported from a radio base station apparatus to a user terminal through higher layer signaling (RRC signaling).

With the present invention, it is equally possible to provide a plurality of tables such as the ones shown in FIG. 6B and FIG. 7B in a radio base station apparatus and use an adequate table depending on the mode of cross-carrier scheduling. Note that the tables shown in FIG. 6B and FIG. 7B are simply examples and these are by no means limiting.

Figure 8:
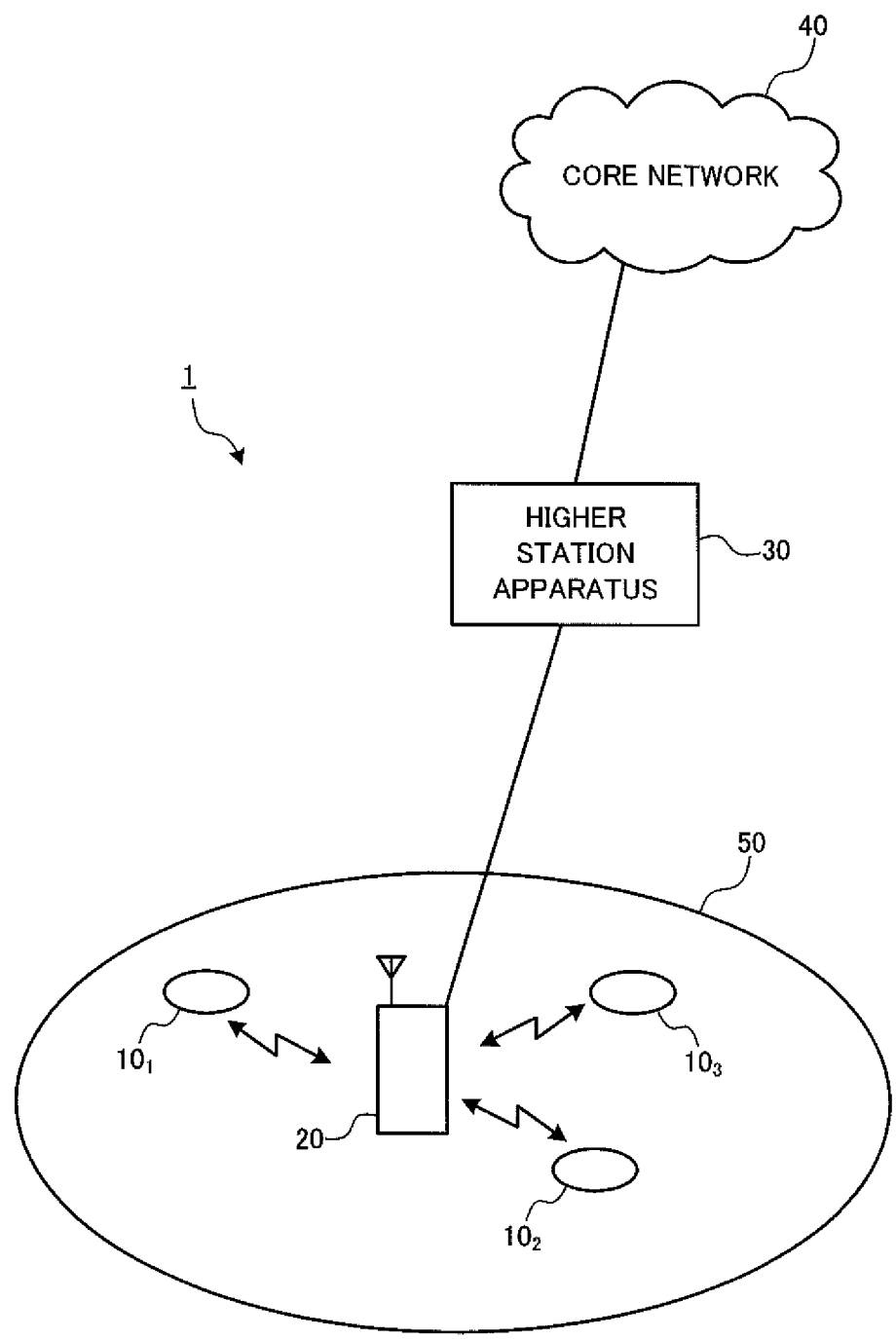
FIG. 8 is a diagram to explain a system configuration of a radio communication system.

Now, a radio communication system according to an embodiment of the present invention will be described below in detail. FIG. 8 is a diagram to explain a system configuration of a radio communication system according to the present embodiment. Note that the radio communication system shown in FIG. 8 is a system to accommodate, for example, the LTE system or SUPER 3G. This radio communication system uses carrier aggregation, which makes a plurality of fundamental frequency blocks, in which the system band of the LTE system is one unit, as one. Also, this radio communication system may be referred to as "IMT-Advanced" or "4G."

As shown in FIG. 8, a radio communication system 1 is configured to include a radio base station apparatus 20, and a plurality of user terminals $10_1$, $10_2$ and $10_3$ that communicate with this radio base station apparatus 20. This radio communication system 1 allows radio communication between the radio base station apparatus and the user terminals by time division duplexing, and allows broadbandization by carrier aggregation. Also, even when the radio communication system 1 adopts a configuration in which there are fewer downlink subframes in the P-cell than the downlink subframes in the S-cell, victim subframes of the S-cell are scheduled in S-subframes of the P-cell.

The radio base station apparatus 20 is connected with a higher station apparatus 30, and this higher station apparatus 30 is connected with a core network 40. Also, radio base station apparatuses 20 are connected with each other by wire connection or by wireless connection. The user terminals $10_1$, $10_2$ and $10_3$ are able to communicate with the radio base station apparatus 20 in a cell 50. Note that the higher station apparatus 30 is, for example, an access gateway apparatus, a radio network controller (RNC), a mobility management entity (MME) and so on, but is by no means limited to these.

The user terminals $10_1$, $10_2$ and $10_3$ include LTE terminals and LTE-A terminals. Also, although the following description will assume, for ease of explanation, that the user terminals $10_1$, $10_2$ and $10_3$ perform radio communication with the radio base station apparatus 20, more generally, user apparatuses (UE) to include both user terminals and fixed terminal apparatuses may be used as well.

As for radio access schemes, in the radio communication system 1, OFDMA (Orthogonal Frequency Division Multiple Access) is adopted on the downlink, and SC-FDMA (Single-Carrier Frequency Division Multiple Access) is adopted on the uplink, but the uplink radio access scheme is by no means limited to this. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Downlink communication channels include a PDSCH, which is a downlink data channel used by the user terminals $10_1$, $10_2$ and $10_3$ on a shared basis, and downlink L1/L2 control channels (PDCCH, PCFICH, PHICH). Transmission data and higher control information are transmitted by the PDSCH. Scheduling information for the PDSCH and the PUSCH and so on are transmitted by the PDCCH. The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Uplink communication channels include a PUSCH (Physical Uplink Shared Channel), which is an uplink data channel used by each user terminal on a shared basis, and a PUCCH (Physical Uplink Control Channel), which is an uplink control channel. Transmission data and higher control information are transmitted by means of this PUSCH. Also, by means of the PUCCH, downlink received quality information (CQI), ACK/NACK and so on are transmitted.

An overall configuration of a radio base station apparatus according to the present embodiment will be described with reference to FIG. 9. A base station apparatus 20 has a transmitting/receiving antenna 201, an amplifying section 202, a transmitting/receiving section (reporting section) 203, a baseband signal processing section 204, a call processing section 205, and a transmission path interface 206. Transmission data to be transmitted from the radio base station apparatus 20 to a user terminal on the downlink is input from the higher station apparatus 30, into the baseband signal processing section 204, via the transmission path interface 206.

In the baseband signal processing section 204, a signal of the downlink data channel is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, a signal of a physical downlink control channel, which is a downlink control channel, is also subjected to transmission processes such as channel coding and an inverse fast Fourier transform.

The baseband signal processing section 204 reports control information for allowing the user terminals 10 to perform radio communication with the radio base station apparatus 20, to each user terminal 10 connected to the same cell, through a broadcast channel. The information for allowing communication in the cell includes, for example, the uplink or downlink system bandwidth, root sequence identification information (root sequence index) for generating random access preamble signals in the PRACH (Physical Random Access Channel), and so on.

The transmitting/receiving section 203 converts a baseband signal that is output from the baseband signal processing section 204 into a radio frequency band. The amplifying section 202 amplifies the radio frequency signal having been subjected to frequency conversion, and outputs the result to the transmitting/receiving antenna 201. Note that the transmitting/receiving section 203 constitutes a transmitting means to transmit downlink signals including the PDCCH signal, to the user terminals.

Meanwhile, as for signals to be transmitted from the user terminals 10 to the radio base station apparatus 20 on the uplink, a radio frequency signal received by the transmitting/receiving antenna 201 is amplified in the amplifying section 202, converted into a baseband signal through frequency conversion in the transmitting/receiving section 203, and input in the baseband signal processing section 204.

The baseband signal processing section 204 performs an FFT (Fast Fourier Transform) process, an IDFT (Inverse Discrete Fourier Transform) process, error correction decoding, a MAC retransmission control receiving process, and RLC layer and PDCP layer receiving processes, of the transmission data that is included in the baseband signal received on the uplink. The decoded signal is transferred to the higher station apparatus 30 through the transmission path interface 206.

The call processing section 205 performs call processes such as setting up and releasing communication channels, manages the state of the radio base station apparatus 20 and manages the radio resources.

Figure 9:
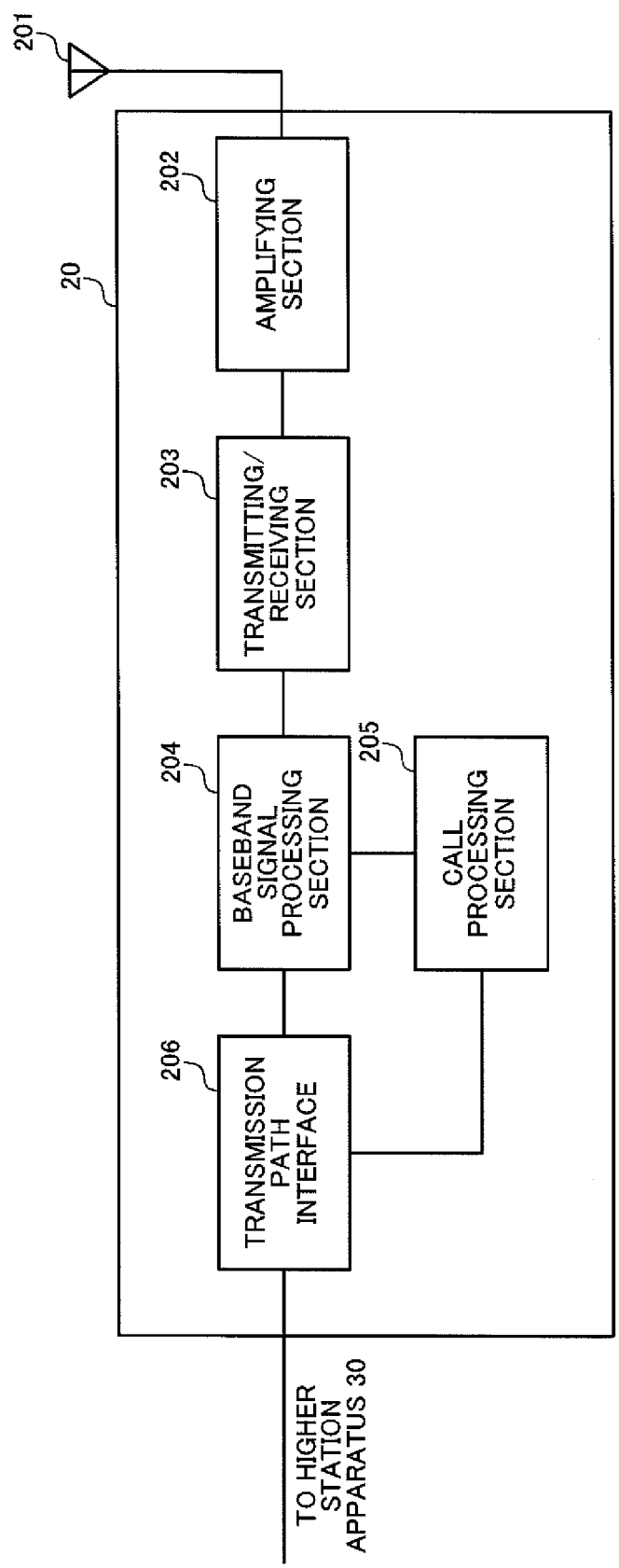
FIG. 9 is a diagram to explain an overall configuration of a radio base station apparatus.
Figure 10:
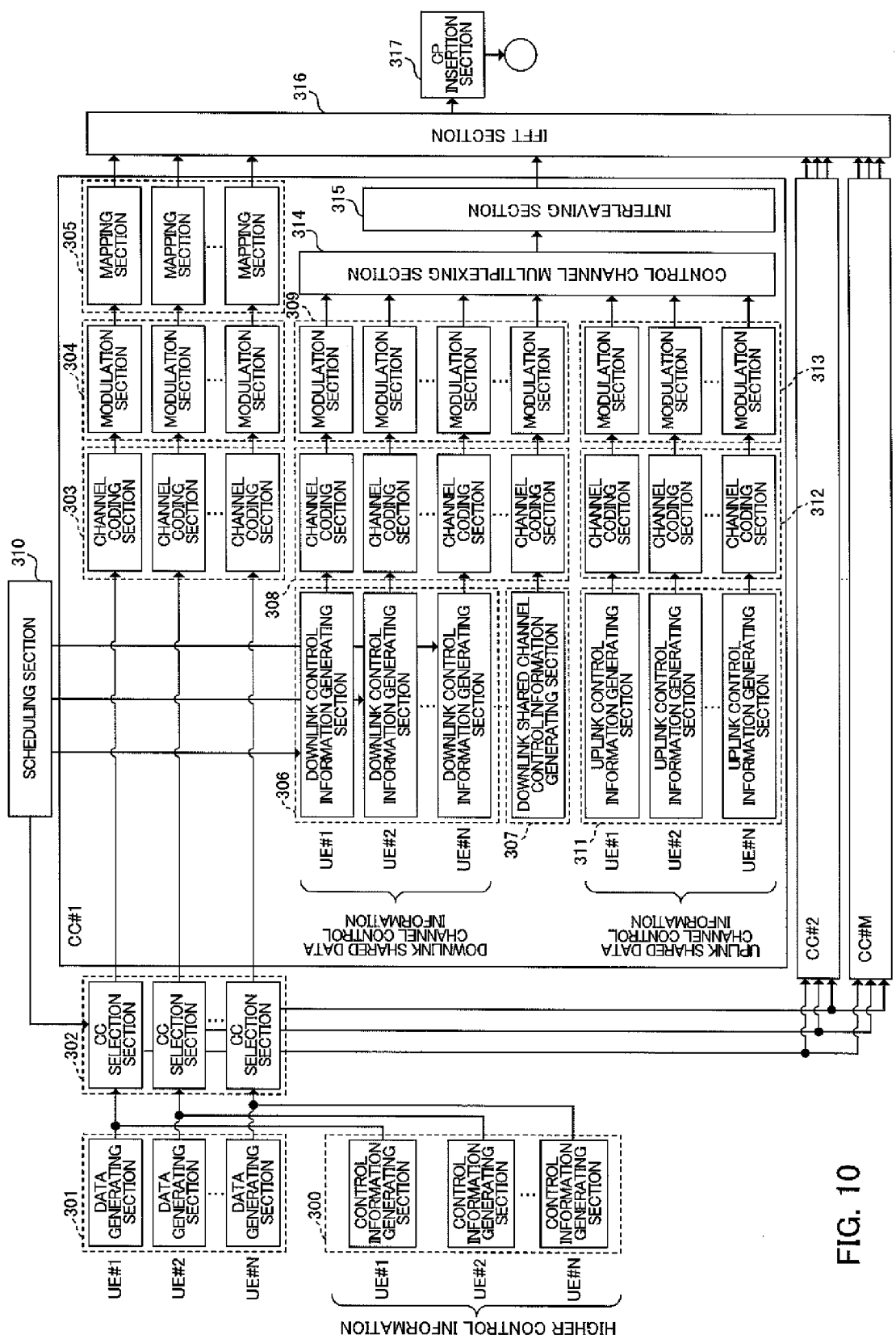
FIG. 10 is a functional block diagram corresponding to a baseband processing section of a radio base station apparatus.

FIG. 10 is a block diagram showing a configuration of a baseband signal processing section in the radio base station apparatus shown in FIG. 9. The baseband signal processing section 204 in FIG. 10 primarily shows the function blocks of a transmission processing section. FIG. 10 illustrates an example of a base station configuration which can support maximum M (CC #1 to CC #M) component carriers. Transmission data for user terminals 10 under the radio base station apparatus 20 is transferred from the higher station apparatus 30 to the radio base station apparatus 20.

Control information generating sections 300 generate higher control signals for higher layer signaling (for example, RRC signaling), on a per user basis. Data generating sections 301 output transmission data transferred from the higher station apparatus 30 as user data, separately, on a per user basis.

Component carrier selection sections 302 select component carriers to be used for radio communication with the user terminals 10, on a per user basis. As described above, an addition/removal of component carriers is reported from the radio base station apparatus 20 to the user terminals 10 through RRC signaling, and complete messages are received from the user terminals 10. Upon receipt of these complete messages, the allocation (addition/removal) of component carriers with those users is fixed, and the fixed component carrier allocation is set in the component carrier selection sections 302 as component carrier allocation information. In accordance with the component carrier allocation information that is set in the component carrier selection sections 302 on a per user basis, higher control signals and transmission data are allocated to channel coding sections 303 of the applicable component carriers. Component carriers are allocated so that an anchor carrier is included in the component carriers selected by the component carrier selection sections 302.

The scheduling section 310 controls the allocation of component carriers to the user terminals 10 under control, according to the overall communication quality of the system band. The scheduling section 310 determines the addition/removal of component carriers to allocate to communication with the user terminals 10. The decision result related to the addition/removal of component carriers is reported to the control information generating sections 300.

The scheduling section 310 controls the resource allocation in component carriers CC #1 to CC #M. An LTE terminal user and an LTE-A terminal user are scheduled separately. The scheduling section 310 receives as input transmission data and retransmission commands from the higher station apparatus 30, and also receives as input channel estimation values and resource block CQIs from the receiving section having measured uplink received signals. The scheduling section 310 schedules uplink and downlink control signals and uplink and downlink shared channel signals, with reference to the retransmission commands input from the higher station apparatus 30, the channel estimation values and the CQIs. A propagation path in mobile communication varies differently per frequency, due to frequency selective fading. So, the scheduling section 310 allocates resource blocks of good communication quality to each user terminal 10, on a per subframe basis, when user data is transmitted to the user terminals 10 (which is referred to as "adaptive frequency scheduling"). In adaptive frequency scheduling, a user terminal 10 of good propagation path quality is selected for each resource block and assigned. Consequently, the scheduling section 310 allocates resource blocks, using the CQI of each resource block, fed back from each user terminal 10. Also, MCS (coding rate and modulation scheme) that fulfills a required block error rate with the allocated resource blocks is determined. Parameters to fulfill the MCS (coding rate and modulation scheme) determined by the scheduling section 310 are set in channel coding sections 303, 308 and 312, and in modulation sections 304, 309 and 313. The scheduling section 310 schedules S-subframes, C-subframes, and V-subframes, on a per CC basis.

The baseband signal processing section 204 has channel coding sections 303, modulation sections 304, and mapping sections 305, to match the maximum number of users to be multiplexed in one component carrier, N. The channel coding sections 303 perform channel coding of the downlink shared data channel (PDSCH), which is formed with user data (including part of higher control signals) output from the data generating sections 301, on a per user basis. The modulation sections 304 modulate the user data having been subjected to channel coding, on a per user basis. The mapping sections 305 map the modulated user data to radio resources.

Also, the baseband signal processing section 204 has downlink control information generating sections 306 that generate downlink shared data channel control information, which is user-specific downlink control information, and a downlink shared channel control information generating section 307 that generates downlink shared control channel control information, which is user-common downlink control information.

The downlink control information generating sections 306 generate downlink control information (DCI) from resource allocation information, MCS information, HARQ information, PUCCH transmission power control commands and so on, which are determined on a per user basis. The downlink control information generating sections 306 generate DCI, which includes a CIF associating CIs and the indices of S-cell subframes to be scheduled. To be more specific, the downlink control information generating sections 306 have a table such as the ones shown in FIG. 6 and FIG. 7, and determine a CIF with respect to a P-cell subframe, from information about CIs and the indices of S-cell subframes to be scheduled, and generate DCI including this CIF. For example, when a search space is shared between CC 1 and CC 2, if CI is #2 and the index of S-cell subframes to be scheduled is index=1, CIF="100" is determined with reference to the table shown in FIG. 6B, and DCI to include this CIF is generated. Also, the downlink control information generating sections 306 generates DCI including CIs, with respect to C-subframes. Then, downlink control channel signals (PDCCH signals) having DCI generated in this way are generated. Also, if necessary (for example, in the event of a configuration in which there are fewer downlink subframes in the P-cell than the downlink subframes in the S-cell), in one PDCCH signal, information about the S-cell subframes to be scheduled is included. Note that information about S-cell subframes which a P-cell subframe can schedule (mapping information of P-cell subframes and S-cell subframes) is reported to the user terminals through higher layer signaling (RRC signaling).

The baseband signal processing section 204 has channel coding sections 308 and modulation sections 309 to match the maximum number of users to be multiplexed in one component carrier, N. The channel coding sections 308 perform channel coding of the control information generated in the downlink control information generating sections 306 and downlink shared channel control information generating section 307, on a per user basis. The modulation sections 309 modulate the downlink control information after channel coding.

Also, the baseband signal processing section 204 has uplink control information generating sections 311 that generate uplink shared data channel control information, which is control information for controlling the uplink shared data channel (PUSCH), on a per user basis, channel coding sections 312 that perform channel coding of the generated uplink shared data channel control information on a per user basis, and modulation sections 313 that modulate the uplink shared data channel control information having been subjected to channel coding, on a per user basis.

The control information that is modulated on a per user basis in the above modulation sections 309 and 313 is multiplexed in a control channel multiplexing section 314, and furthermore interleaved in an interleaving section 315. The control signal that is output from the interleaving section 315 and the user data that is output from the mapping sections 305 are input in an IFFT section 316 as downlink channel signals. The IFFT section 316 converts the downlink channel signals from frequency domain signals into a time sequence signal by performing an inverse fast Fourier transform. A cyclic prefix (CP) insertion section 317 inserts cyclic prefixes in the time sequence signal of the downlink channel signals. Note that a cyclic prefix functions as a guard interval for cancelling the differences in multipath propagation delay. Transmission data, to which cyclic prefixes have been added, is transmitted to the transmitting/receiving sections 203.

Next, an overall configuration of a user terminal according to the present embodiment will be described with reference to FIG. 11. The user terminal $10_1$, $10_2$, and $10_3$ have the same configuration and therefore will be described simply as "user terminal 10." An LTE terminal and an LTE-A terminal have the same hardware configurations in principle parts, and therefore will be described indiscriminately. The user terminal 10 has a transmitting/receiving antenna 101, an amplifying section 102, a transmitting/receiving section (receiving section) 103, a baseband signal processing section 104, and an application section 105.

As for downlink data, a radio frequency signal that is received in the transmitting/receiving antenna 101 is amplified in the amplifying section 102, and subjected to frequency conversion and converted into a baseband signal in the transmitting/receiving section 103. This baseband signal is subjected to receiving processes such as an FFT process, error correction decoding and retransmission control, in the baseband signal processing section 104. In this downlink data, downlink transmission data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT (Discrete Fourier Transform) process, and an IFFT process. The baseband signal that is output from the baseband signal processing section 104 is converted into a radio frequency band in the transmitting/receiving section 103. After that, the radio frequency signal having been subjected to frequency conversion is amplified in the amplifying section 102, and transmitted from the transmitting/receiving antenna 101. Note that the transmitting/receiving section 103 constitutes a receiving means to receive downlink control channel signals.

Figure 11:
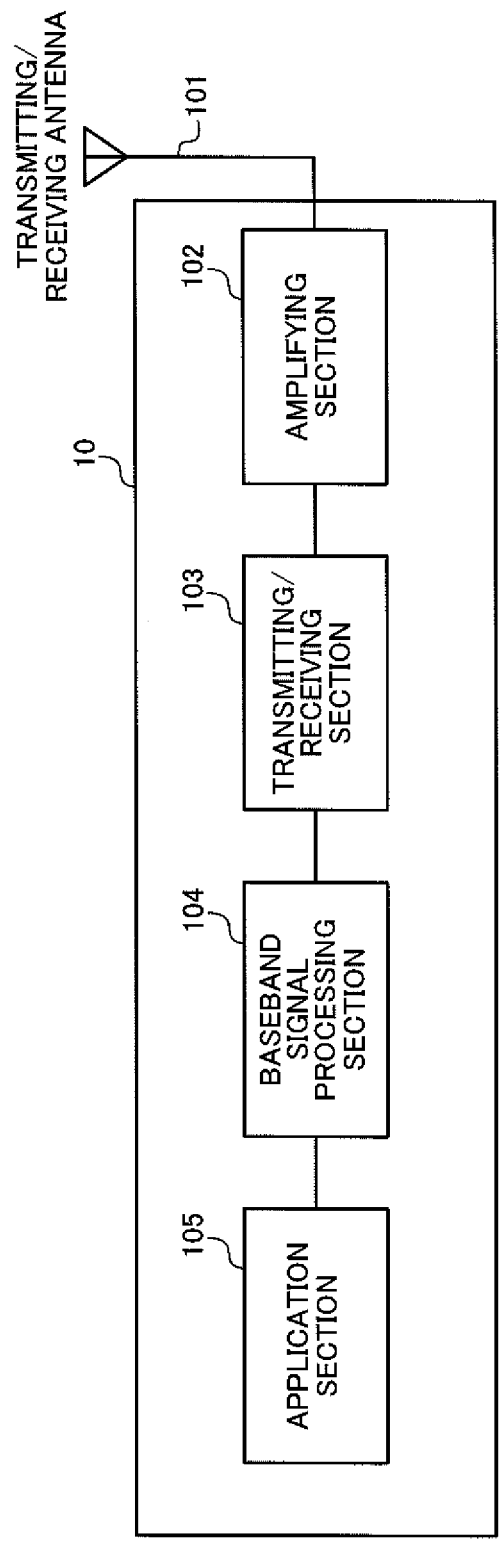
FIG. 11 is a diagram to explain an overall configuration of a user terminal.
Figure 12:
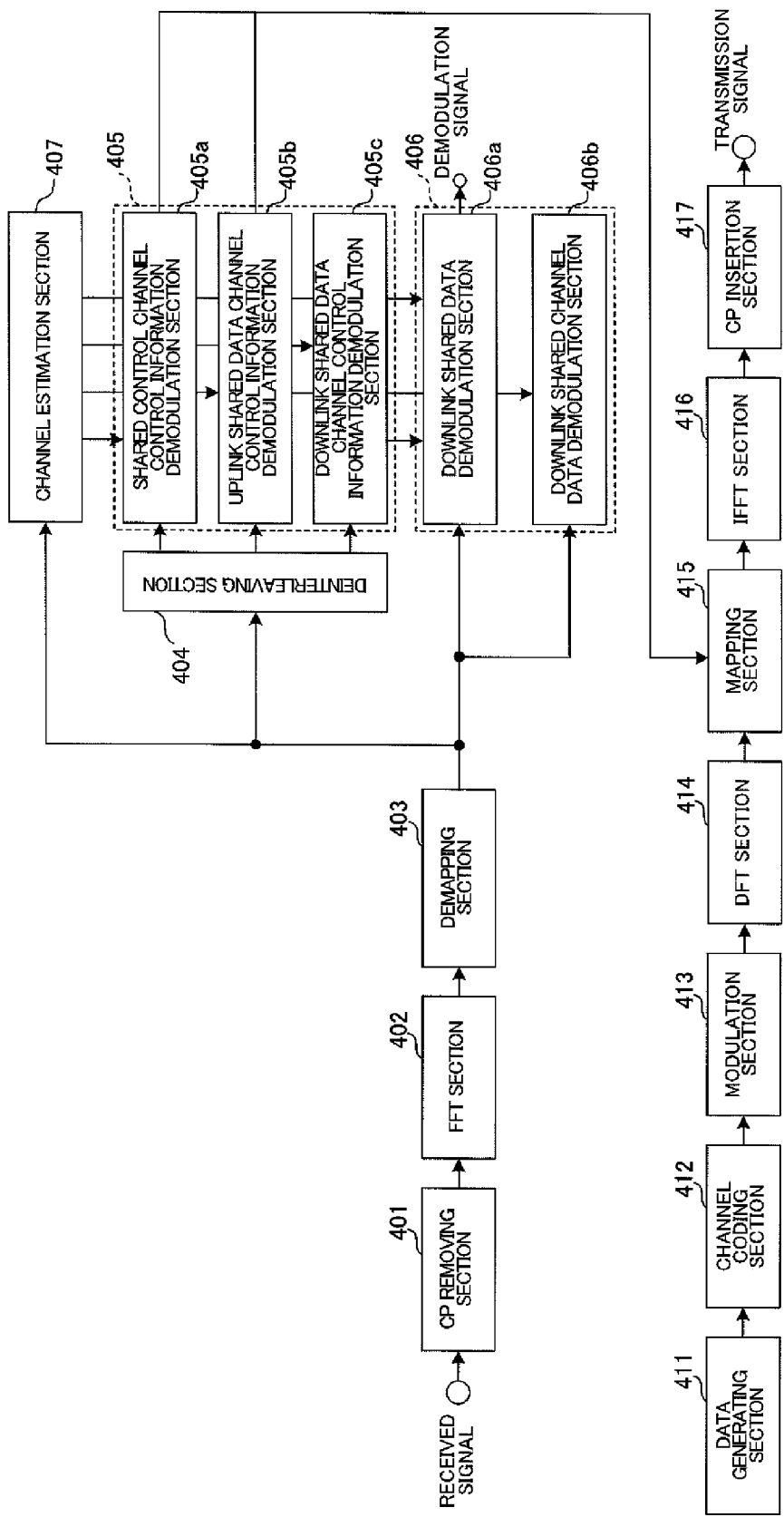
FIG. 12 is a functional block diagram corresponding to a baseband processing section of a user terminal.

FIG. 12 is a block diagram to show a configuration of a baseband signal processing section 104 in the user terminal 10 shown in FIG. 11, and shows the function blocks of an LTE-A terminal which supports LTE-A. First, the downlink configuration of the user terminal 10 will be described. The baseband signal processing section 104 is a signal processing section that executes signal processing with respect to downlink signals according to downlink control information.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are input from the application section 105. The multiplex control information output from the demapping section 403 is deinterleaved in a deinterleaving section 404.

Also, the baseband signal processing section 104 has a control information demodulation section 405 that demodulates control information, a data demodulation section 406 that demodulates downlink shared data, and a channel estimation section 407. The control information demodulation section 405 includes a shared control channel control information demodulation section 405a that demodulates downlink shared control channel control information from the multiplex control information, an uplink shared data channel control information demodulation section 405b that demodulates uplink shared data channel control information from the multiplex control information, and a downlink shared data channel control information demodulation section 405c that demodulates downlink shared data channel control information from the multiplex control information. The data demodulation section 406 includes a downlink shared data demodulation section 406a that demodulates user data and higher control signals, and a downlink shared channel data demodulation section 406b that demodulates downlink shared channel data.

The shared control channel control information demodulation section 405a extracts shared control channel control information, which is control information that is common between users, by, for example, performing a blind decoding process, a demodulation process, and a channel decoding process of the common search space in the multiplex control information (PDCCH). The shared control channel control information, including downlink channel quality information (CQI), is input in a mapping section 115, which will be described later, and is mapped as part of transmission data for the radio base station apparatus 20.

The shared control channel control information demodulation section 405a extracts the CI and the index of a subframe to be scheduled, from the CIF included in the DCI. To be more specific, the shared control channel control information demodulation section 405a has a table such as the ones shown in FIG. 6 and FIG. 7, and, with reference to this table, extracts the CI and the index of a subframe to be scheduled from the CIF included in the DCI. For example, when a search space is shared between CC 1 and CC 2 and CIF="110," the shared control channel control information demodulation section 405a determines that the CI is #2 and the index of the subframe to be scheduled is index=1, with reference to the table shown in FIG. 6B. Information about the CI and the index of the subframe to be scheduled, found in this way, is sent to the downlink shared data channel control information demodulation section 405c, and used in the receiving process of the PDCCH signal.

The uplink shared data channel control information demodulation section 405b extracts uplink shared data channel control information, which is user-specific uplink control information, by, for example, performing a blind decoding process, a demodulation process, and a channel decoding process of the user-specific search spaces in the multiplex control information (PDCCH). The uplink shared data channel control information is used to control the uplink shared data channel (PUSCH), and is input in the downlink shared channel data demodulation section 406b. Also, the uplink shared data channel control information demodulation section 405b extracts the CI from the DCI, with respect to a C-subframe. This CI is used in the process for transmitting the PUSCH signal.

The downlink shared data channel control information demodulation section 405c extracts downlink shared data channel control information, which is user-specific downlink control information, by, for example, performing a blind decoding process, a demodulation process, and a channel decoding process of the user-specific search spaces in the multiplex control information (PDCCH). The downlink shared data channel control information is used to control the downlink shared data channel (PDSCH), and is input in the downlink shared data demodulation section 406. Also, the downlink shared data channel control information demodulation section 405c performs receiving processes of the PDSCH signal, based on information about the CI and the index of the subframe to be scheduled. At this time, since information about S-cell subframes which a P-cell subframe can schedule (mapping information of P-cell subframes and S-cell subframes) is reported in advance from the radio base station apparatus through higher layer signaling, it is possible to identify the S-cell subframes (subframe numbers) to be scheduled in the P-cell.

Also, the downlink shared data channel control information demodulation section 405c performs the blind decoding process of the user-specific search spaces, based on information related to the PDCCH and the PDSCH which is included in the higher control signals demodulated in the downlink shared data demodulation section 406a.

The downlink shared data demodulation section 406a acquires the user data, higher control information and so on, based on the downlink shared data channel control information received as input from the downlink shared data channel control information demodulation section 405c. The higher control information is output to a channel estimation section 407. The downlink shared channel data demodulation section 406bc demodulates downlink shared channel data based on the uplink shared data channel control information that is input from uplink shared data channel control information demodulation section 405b.

The channel estimation section 407 performs channel estimation using a common reference signal. The estimated channel variation is output to the shared control channel control information demodulation section 405a, the uplink shared data channel control information demodulation section 405b, the downlink shared data channel control information demodulation section 405c and the downlink shared data demodulation section 406a. These demodulation sections demodulate downlink signals using the estimated channel variation and demodulation reference signals.

The baseband signal processing section 104 has, as function blocks of the transmission processing system, a data generating section 411, a channel coding section 412, a modulation section 413, a DFT section 414, a mapping section 415, an IFFT section 416, and a CP insertion section 417. The data generating section 411 generates transmission data from bit data that is received as input from the application section 105. The channel coding section 412 applies channel coding processing such as error correction to the transmission data, and the modulation section 413 modulates the transmission data after channel coding by QPSK and so on. The DFT section 414 performs a discrete Fourier transform on the modulated transmission data. The mapping section 415 maps the frequency components of the data symbol after the DFT to subcarrier positions designated by the radio base station apparatus. That is to say, the mapping section 415 inputs the frequency components of the data symbol in subcarrier positions in the IFFT section 416 having a bandwidth to match the system band, and sets 0 for other frequency components. The IFFT section 416 converts input data matching the system band into time sequence data by performing an inverse fast Fourier transform, and the CP insertion section 417 inserts cyclic prefixes in the time sequence data per data division.

In the radio communication system having the above configuration, the downlink control information generating sections 306 in the radio base station apparatus generate DCI, which includes a CIF associating CIs and the indices of subframes to be scheduled. For example, with respect to an S-subframe, a CIF is determined from the information about CIs and the indices of subframes to be scheduled, and DCI to include that CIF is generated. For example, when a common search space is set for a number of CCs, with reference to the table shown in FIG. 6B or FIG. 7B, a CIF to associate a CI and the index of a subframe to be scheduled is determined, and DCI to include that CIF is generated. For example, when a search space is shared between CC 1 and CC 2, the CI is #2, and the index of a subframe to be scheduled is index=1, CIF="100" is determined with reference to the table shown in FIG. 6B, and DCI to include this CIF is generated. In this way, S-cell subframes (downlink subframes, victim subframes) are scheduled. The radio base station apparatus generates PDCCH signals having DCI generated in this way, and transmits the PDCCH signals to the user terminals.

The shared control channel control information demodulation section 405a of a user terminal extracts the CI and the index of the subframe to be scheduled, from the CIF included in the DCI. For example, when a common search space is set for a number of CCs, the shared control channel control information demodulation section 405a extracts the CI and the index indices of the subframe to be scheduled from the CIF, with reference to the table shown in FIG. 6B or FIG. 7B. When a search space is shared between CC 1 and CC 2, and CIF="100," assume that the CI is #2 and the index of the subframe to be scheduled is index=1, according to the table shown in FIG. 6B. At this time, information about S-cell subframes which a P-cell subframe can schedule (mapping information of P-cell subframes and S-cell subframes) is reported in advance from the radio base station apparatus through higher layer signaling. Consequently, the user terminal is able to identify the S-cell subframe (subframe number) to be scheduled in the P-cell. Using information about the CI and the index of the subframes to be scheduled found out in this way (in addition, information about S-cell subframes which a P-cell subframe can schedule), the downlink shared data channel control information demodulation section 405c performs the receiving process of the PDSCH signal.

With this control method, information that associates CIs and the indices of subframes to be scheduled is included in the CIF, so that it is possible to dynamically report the indices of subframes to be scheduled to user terminals. In this way, since information about the indices of S-cell subframes to be scheduled in a P-cell subframe can be dynamically reported to user terminals, even when the ratio between uplink subframes and downlink subframes is changed in each component carrier in TDD carrier aggregation, it is still possible to prevent a decrease in capacity.

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2011-245866, filed on Nov. 9, 2011, including the specification, drawings, and abstract, is incorporated herein by reference in its entirety.

The invention claimed is:

1. A radio communication system comprising:
  a radio base station apparatus configured to:
    generate downlink control information including carrier indicator field (CIF) representing a carrier index and a subframe index; and
    transmit the downlink control information including the CIF; and
  a user terminal configured to:
    receive the downlink control information including the CIF; and
    perform signal processing on a downlink shared channel which is transmitted by time division duplexing in a component carrier and a subframe indicated by the carrier index and the subframe index which are represented by the CIF included in the downlink control information.

2. The radio communication system according to claim 1, wherein, the radio base station apparatus is configured to transmit the downlink control information including the CIF in a special subframe of a primary cell, when a configuration in which there are fewer downlink subframes in the primary cell than downlink subframes in the secondary cell is used.

3. The radio communication system according to claim 2, wherein the radio base station apparatus is configured to transmit mapping information of a subframe of the primary cell and a subframe of the secondary cell to the user terminal through higher layer signaling.

4. The radio communication system according to claim 1, wherein the radio base station apparatus transmits mapping information of a subframe of the primary cell and a subframe of the secondary cell to the user terminal through higher layer signaling.

5. A radio base station apparatus comprising:
  a receiving section that receives an unlink signal;
  a software module generating downlink control information including carrier indicator field (CIF) representing a carrier index and a subframe index, wherein the carrier index and the subframe index respectively indicates a component carrier and a subframe in which a downlink shared channel is transmitted by time division duplexing; and
  a transmission section that transmits the downlink control information including the CIF to the user terminal.

6. The radio base station apparatus according to claim 5, wherein, the transmission section transmits the downlink control information including the CIF in a special subframe of a primary cell, when a configuration in which there are fewer downlink subframes in the primary cell than downlink subframes in the secondary cell is used.

7. The radio base station apparatus according to claim 6, wherein the transmission section transmits mapping information of a subframe of the primary cell and a subframe of the secondary cell to the user terminal through higher layer signaling.

8. The radio base station apparatus according to claim 5, wherein the transmission section transmits mapping information of a subframe of the primary cell and a subframe of the secondary cell to the user terminal through higher layer signaling.

9. A user terminal comprising:
a receiving section that receives downlink control information including carrier indicator field (CIF) representing a carrier index and a subframe index;
a software module performing signal processing on a downlink shared channel which is transmitted by time division duplexing in a component carrier and a subframe respectively indicated by the carrier index and the subframe index which are represented by the CIF in the downlink control information; and
a transmission section that transmits an uplink signal.

10. A radio communication method comprising the steps of:
generating, by a radio base station apparatus, downlink control information including carrier indicator field (CIF) representing a carrier index and a subframe index;
transmitting, by the radio base station apparatus, the downlink control information including the CIF; and
receiving, by a user terminal, the downlink control information including the CIF; and
performing, by the user terminal, signal processing on a downlink shared channel which is transmitted by time division duplexing in a component carrier and a subframe respectively indicated by the carrier index and the subframe index which are represented by the CIF in the downlink control information.

11. The radio communication method according to claim 10, wherein the radio base station apparatus transmits the downlink control information including the CIF in a special subframe of a primary cell, when a configuration in which there are fewer downlink subframes in the primary cell than downlink subframes in the secondary cell is used.

12. The radio communication method according to claim 11, wherein the radio base station apparatus transmits mapping information of a subframe of the primary cell and a subframe of the secondary cell to the user terminal through higher layer signaling.

13. The radio communication method according to one of claim 10, wherein the radio base station apparatus transmits mapping information of a subframe of the primary cell and a subframe of the secondary cell to the user terminal through higher layer signaling.

* * * * *